United States Patent Office 3,278,470
Patented Oct. 11, 1966

3,278,470
CONDENSATION PRODUCTS OF FORMALDE-
HYDE RESIN PRECONDENSATES WITH
POLYACETALS
Albert Ewart Henshall and Gwilym Thomas Jones, Man-
chester, England, assignors to Imperial Chemical In-
dustries Limited, London, England, a corporation of
Great Britain
No Drawing. Filed Dec. 17, 1962, Ser. No. 244,947
Claims priority, application Great Britain, Dec. 27, 1961,
46,337/61
6 Claims. (Cl. 260—21)

This invention relates to new acetal condensation products and their use for treating textiles.

According to the present invention we provide acetal condensation products by reacting a water soluble or water dispersible formaldehyde resin precondensate with a water-soluble or water-dispersible polyacetal derived from an aldehyde containing fewer than 10 carbon atoms and a polyethenoxy compound containing at least two hydroxyl groups.

Polyacetals suitable for use in the invention may be prepared by known methods, for example as described in U.S. patent specification No. 2,968,581. Aldehydes of aliphatic, cycloaliphatic or araliphatic series containing fewer than 10 carbon atoms such as formaldehydes, acetaldehydes, propionaldehyde, butyraldehyde or glyoxal may be used for the preparation of the polyacetal, formaldehyde and especially glyoxal being preferred. Examples of suitable polyethenoxy compounds containing at least two hydroxyl groups include the polyethylene glycols, ethylene oxide condensates of glycerol and their monoesters with fatty acids (preferably fatty acids containing up to 20 carbon atoms), ethylene oxide condensates of primary amines and their derived quaternary ammonium salts, and ethylene oxide condensates of triethanolamine. It is preferred that the polyethenoxy compounds from which the polyacetals are prepared should be water soluble or water dispersible and that the polyethenoxy chain or chains should form the major part by weight of the polyacetal molecule.

The aldehyde and the polyethenoxy compound are reacted together in such proportions as to give a water-soluble or water-dispersible polyacetal. Thus a monoaldehyde such as formaldehyde and a difunctional polyethenoxy compound such as a polyoxyethylene glycol are preferably reacted in substantially equimolar proportions, though, if desired, an excess of the polyethenoxy compound may be used. When a monoaldehyde is reacted with a tri- or poly-functional polyethenoxy compound or when a dialdehyde such as glyoxal is reacted with a difunctional polyethenoxy compound then the use of equivalent quantities leads to the formation of insoluble intractable gels. In these cases it is preferred to use a substantial excess of the polyethenoxy compound so as to obtain a water-soluble or water dispersible product.

The aldehyde and the polyethenoxy compound may be reacted together by any of the normal techniques used for the preparation of acetals. A convenient method is to react them at an elevated temperature in the presence of a strong acid catalyst in solution in a solvent which forms an azeotropic mixture with water. Thus they may be reacted in benzene or toluene solution at the boiling point, using sulphuric acid or p-toluenesulphonic acid as catalyst.

Suitable formaldehyde resin precondensates include the well known urea/formaldehyde and melamine formaldehyde condensation products, dimethylol urea, trimethylolmelamine, hexamethylol melamine, dimethylolethylene urea, 1:3 - dimethylol - 5 - (β - hydroxyethyl) - hexahydrotriazin-2-one, the dimethylol derivative of glyoxal monoureide, the tetramethylol derivative of glyoxal diureide, the corresponding ethyl ethers and water soluble or water dispersible condensation products. But in general any water soluble or water dispersible initial stage reaction product of a condensation resin derived by interaction with formaldehyde of a compound containing the group

or containing the group

may be used to prepare the condensation products.

Reaction between the aldehyde resin precondensate and the polyacetal is carried out by heating, preferably in presence of an acid-reacting catalyst capable of promoting the condensation. Examples of suitable acid-reacting catalysts include ammonium chloride, ammonium thiocyanate and zinc nitrate. It is usual to employ from about 0.1 part to about 5.0 parts of resin precondensate per part by weight of polyacetal and it is preferred to use sufficient resin precondensate to form a water-insoluble acetal condensation product.

The acetal condensation products are of value for the treatment of textiles, more especially in that they confer antistatic properties on synthetic hydrophobic fibres which are resistant to wearing, washing and dry cleaning. For this purpose the acetal condensation product is conveniently formed in situ. Thus the textile materal may be impregnated with an aqueous solution or dispersion containing the polyacetal, the aldehyde resin, and the catalyst and then dried and baked at an elevated temperature, conveniently between 100° C. and 210° C. for a sufficient time to render the condensation product water-soluble. Usually from 0.1% to 10.0% of the acetal condensation product calculated on the weight of the textile material is sufficient to confer antistatic properties which possess valuable resistance to the normal washing and dry-cleaning processes.

The invention is illustrated but not limited by the following Examples in which parts and percentages are by weight.

*Example 1*

200 parts of a polyoxyethylene glycol or average molecular weight 600, 11 parts of paraformaldehyde, 0.2 part of sulphuric acid and 84 parts of toluene were refluxed in a Dean and Stark apparatus until 7.5 parts of water had been evolved. The acid was neutralized with dilute sodium hydroxide solution and solvent was then distilled off under reduced pressure below 110° C. There remained 204 parts of the polyacetal.

*Example 2*

A length of polyethylene terephthalate continuous filament fabric was impregnated with an aqueous solution containing 3% of the product of Example 1, 1.5% of dimethylol urea and 0.5% of ammonium chloride. The fabric increased in weight by 50% as a result of the impregnation. It was dried at 60–70° C. and then baked for 5 minutes at 150° C. Portions of this treated material along with a control piece of untreated material were then given one and five washes in the Atlas launder-o-meter, each washing comprising immersion in 200 ml. of a 0.3% soap and 0.2% soda ash solution at 80° C. for 30 minutes, 5 steel balls being added to the launder-o-meter pot to provide mechanical friction. After each wash the pattern was rinsed thoroughly three times for 5 minutes in water at 80–90° C. then dried at 60–70° C. After conditioning for 24 hours at 65% R.H. and 70° F. untreated and treated materials were tested for antistatic effect by the method described by Hayek and Chromey (Amer. Dyes. Reptr. 1951, 40 164). The antistatic effect produced is illustrated in the table.

|  | Antistatic performance | | | |
|---|---|---|---|---|
|  | 1 wash | | 5 washes | |
|  | μA | ½T | μA | ½T |
| Untreated | 390 | 180 | 300 | >180 |
| Treated | 60 | 16 | 92 | 26 |

μA is the charge generated after 2 minutes rubbing arbitrarily expressed in microamperes.
½T is the time in seconds for the charge to decay to half its value.

*Example 3*

A length of polyethylene terephthale continuous filament fabric was impregnated with an aqueous solution containing 3% of the product of Example 1, 1.4% of trimethylol melamine and 0.5% of ammonium chloride. The fabric increased in weight by 50% as a result of the impregnation. It was dried at 60–70° C. and then baked for 5 minutes at 150° C. Treated and untreated material was then washed and tested as described in Example 2. The antistatic effect produced is illustrated in the table.

|  | Antistatic performance | | | |
|---|---|---|---|---|
|  | 1 wash | | 5 washes | |
|  | μA | ½T | μA | ½T |
| Untreated | 390 | 180 | 300 | >180 |
| Treated | 25 | 1 | 10 | 3 |

μA and ½T have the same significance as in Example 2.

*Example 4*

88.4 parts of a condensate of one mole of glycerol with eighteen moles of ethylene oxide, 3.3 parts of paraformaldehyde, 0.2 part of sulphuric acid and 42 parts of toluene were refluxed in a Dean and Stark apparatus until 2.2 parts of water had been evolved. The acid was neutralised with dilute sodium hydroxide solution and solvent was then distilled off under reduced pressure below 110° C. There remained 92.5 parts of the polyacetal.

*Example 5*

128.6 parts of the ester prepared by the reaction of one molar proportion of lauric acid with one molar proportion of a previously prepared condensate of one mole of glycerol with 23 moles of ethylene oxide, 3.3 parts of paraformaldehyde, 0.2 part of sulphuric acid and 84 parts of toluene were refluxed in a Dean and Stark apparatus until 3.5 parts of water had been evolved. The acid was neutralised with dilute sodium hydroxide solution and solvent was then distilled off under reduced pressure below 110° C. There remained 130.9 parts of the polyacetal.

*Example 6*

60 parts of a polyoxyethylene glycol of average molecular weight 600, 3.8 parts of glyoxal monohydrate, 0.4 part of sulphuric acid and 84 parts of toluene were refluxed in a Dean and Stark apparatus until 1.3 parts of water had been evolved. The acid was neutralised with dilute sodium hydroxide solution and solvent was then distilled off under reduced pressure below 110° C. There remained 59.8 parts of the polyacetal.

*Example 7*

A length of polyethylene terephthalate continuous filament fabric was impregnated with an aqueous solution containing 3% of the product of Example 4, 1.5% of trimethylol melamine and 1% of ammonium chloride. The fabric increased in weight by 50% as a result of the impregnation. It was dried at 60–70° C. and then baked for 5 minutes at 150° C. Further lengths of fabric were treated similarly using aqueous solutions in which the product of Example 4 was replaced by the same weight of the product of Example 5 or 6. Treated and untreated material was then washed and tested as described in Example 2. The antistatic effect produced is illustrated in the table

|  | Antistatic performance | | | |
|---|---|---|---|---|
|  | 1 wash | | 5 washes | |
|  | μA | ½T | μA | ½T |
| Untreated | 520 | >180 | 290 | >180 |
| Treated with product of Example 4 | 37 | 2 | No change | |
| Treated with product of Example 5 | 70 | 14 | 108 | 21 |
| Treated with product of Example 6 | 20 | 1 | 34 | 1 |

μA and ½T have the same significance as in Example 2.

*Example 8*

A length of nylon continuous filament fabric was impregnated with an aqueous solution containing 3% of the product of Example 4, 1.5% of trimethylol melamine and 1% of ammonium chloride. The fabric increased in weight by 50% as a result of the impregnation. It was dried at 60–70° C. and then baked for 5 minutes at 150° C. Further lengths of fabric were treated similarly using aqueous solutions in which the product of Example 4 was replaced by the same weight of the product of Example 5 or 6. Treated and untreated material was then washed and tested as described in Example 2. The antistatic effect produced is illustrated in the table.

|  | Antistatic performance | | | |
|---|---|---|---|---|
|  | 1 wash | | 5 washes | |
|  | μA | ½T | μA | ½T |
| Untreated | 360 | 60 | 330 | 80 |
| Treated with product of Example 4 | 61 | 1 | 76 | 4 |
| Treated with product of Example 5 | 64 | 1 | 78 | 6 |
| Treated with product of Example 6 | 45 | 1 | 140 | 2 |

What we claim is:

1. An acetal condensation product obtained by reacting (a) a water soluble formaldehyde resin precondensate selected from the group consisting of urea formaldehyde, dimethylol urea, trimethylolmelamine, hexamethylol melamine, dimethylolethylene urea, 1:3-dimethylol-5-(B-hydroxyethyl) - hexahydrotriazin-2-one, dimethylol derivative of glyoxal monoureide, tetra methylol derivative of glyoxal diureide and corresponding ethyl ethers with (b) a water soluble polyacetal derived from an aldehyde containing fewer than 10 carbon atoms and selected from the group consisting of formaldehyde, acetaldehyde, propionaldehyde, butyraldehyde and glyaxal and a polyethenoxy compound containing at least two hydroxyl groups.

2. Acetal condensation products according to claim 1 wherein the polyethenoxy compound is a polyoxyethylene glycol.

3. Acetal condensation products according to claim 1 wherein the polyethenoxy compound is an ethylene oxide condensate of glycol.

4. Acetal condensation products according to claim 1 wherein the polyethenoxy compound is a monoester of an ethylene oxide condensate of glycol with a fatty acid containing up to 20 carbon atoms.

5. Water insoluble acetal condensation products according to claim 1 when formed in contact with textile materials.

6. Textile materials containing acetal condensation products according to claim 1.

References Cited by the Examiner

UNITED STATES PATENTS

| | | | |
|---|---|---|---|
| 1,963,762 | 6/1934 | Pungs et al. | 260—71 |
| 2,350,350 | 6/1944 | Gresham | 260—67 |
| 2,382,938 | 8/1945 | Gresham | 260—67 |
| 2,395,265 | 2/1946 | Gresham | 260—67 |
| 2,397,602 | 4/1946 | Gresham | 260—2 |
| 2,512,672 | 6/1950 | Novotny | 260—69 |
| 2,528,359 | 10/1950 | Greenlee | 260—834 |
| 2,574,040 | 11/1951 | Jones et al. | 260—70 |
| 2,637,713 | 5/1953 | Suen et al. | 260—71 |
| 2,785,947 | 3/1957 | Kress et al. | 8—116 |
| 2,895,923 | 7/1959 | Kress | 260—2 |
| 2,960,484 | 11/1960 | Daul | 260—71 XR |
| 2,968,581 | 1/1961 | Kress | 260—73 |
| 2,986,479 | 5/1961 | Markert et al. | 117—139.5 |
| 3,027,352 | 3/1962 | Walling et al. | 260—67 |

FOREIGN PATENTS 807,589   1/1959   Great Britain.

WILLIAM H. SHORT, *Primary Examiner.*

L. M. MILLER, *Assistant Examiner.*

UNITED STATES PATENT OFFICE
CERTIFICATE OF CORRECTION

Patent No. 3,278,470　　　　　　　　　　　　October 11, 1966

Albert Ewart Henshall et al.

It is certified that error appears in the above identified patent and that said Letters Patent are hereby corrected as shown below:

Column 4, line 73, and Column 5, line 1, "glycol", each occurrence, should read -- glycerol --.

Signed and sealed this 5th day of August 1969.

(SEAL)
Attest:

Edward M. Fletcher, Jr.　　　　　　　　WILLIAM E. SCHUYLER, JR.
Attesting Officer　　　　　　　　　　　　Commissioner of Patents